April 8, 1941.  C. E. TACK  2,237,509
BRAKE
Filed July 29, 1939  2 Sheets-Sheet 2
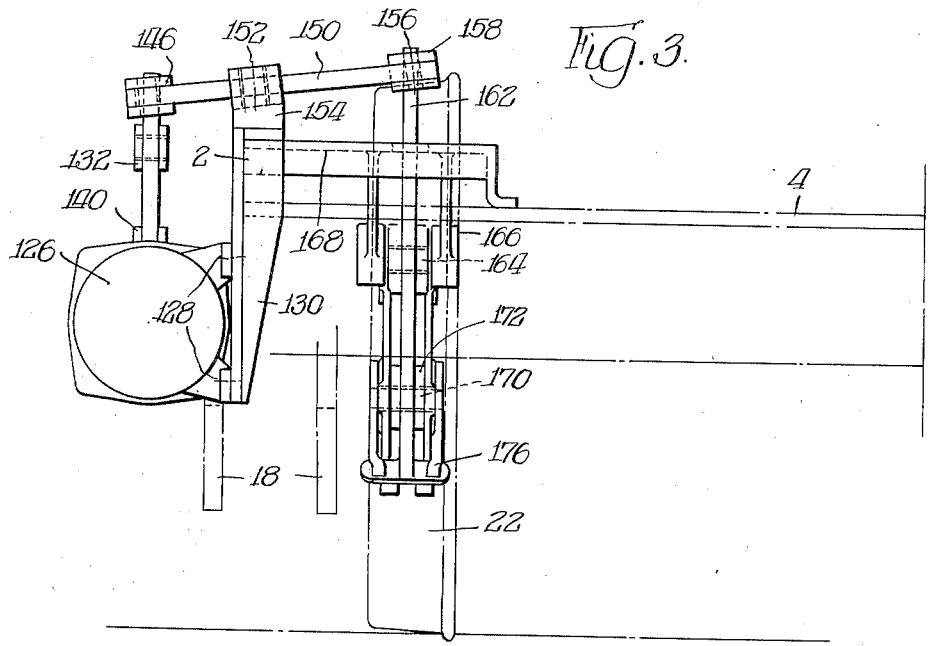
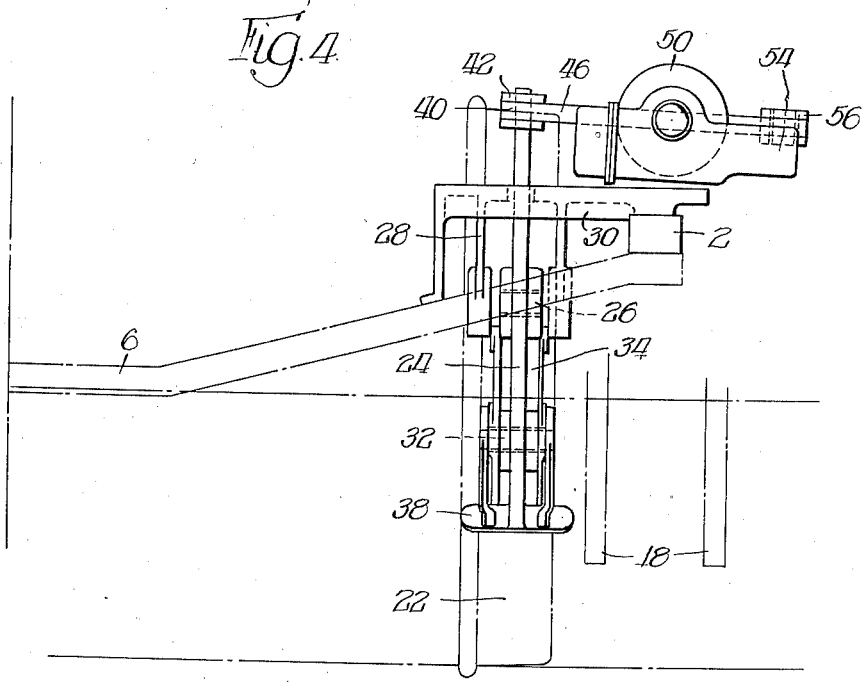
INVENTOR.
Carl E. Tack,
BY
ATTORNEY.

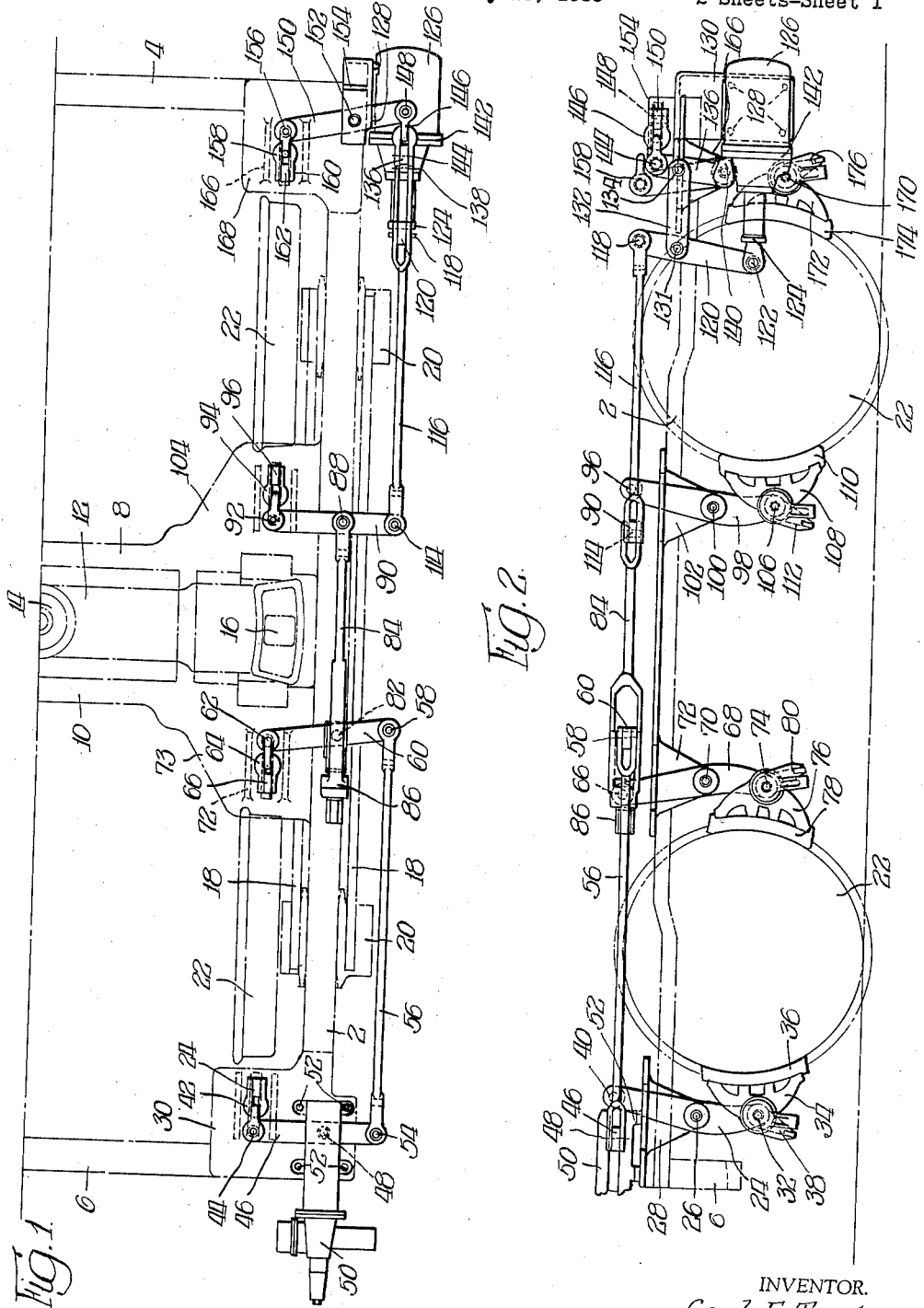

Patented Apr. 8, 1941

2,237,509

UNITED STATES PATENT OFFICE 2,237,509

BRAKE

Carl E. Tack, Chicago, Ill., assignor to American Steel Foundries, Chicago, Ill., a corporation of New Jersey Application July 29, 1939, Serial No. 287,268

30 Claims. (Cl. 188—56)

My invention relates to brake rigging for a railway car truck and more particularly to a type of such rigging commonly designated clasp brakes wherein brake heads and brake shoes are supported at opposite sides of each wheel. Well-known types of such rigging are the beam type wherein the brake heads at opposite sides of the truck are connected by a beam or hanger lever connector, and the beamless type wherein the rigging at opposite sides of the truck is more or less independently suspended. In the beamless type a usual practice is to afford some sort of strap connection between the brake heads and brake shoes at opposite sides of a given wheel in order to maintain a degree of rigidity and prevent too great misalignment with respect to the wheels. Such straps may be located either above or below the axle.

An object of my invention is to devise a type of rigging generally similar to the so-called beamless type wherein the straps commonly straddling the wheels are eliminated, thus doing away with a considerable portion of maintenance.

A further object of such an arrangement is to obviate the necessity of disconnecting such straps when the wheels are changed.

A different object of my invention is to devise a novel and simple form of clasp brake arrangement for a railway car truck particularly suitable for use on modern arrangements of low-hung car bodies. My invention contemplates such an arrangement wherein the number of parts is reduced to a minimum and such parts are so located on the framework of the truck as to afford maximum room for a low-hung car body as well as to accommodate other equipment commonly hung on the truck, such as motors or arrangements of motor generators.

Figure 1 is a top plan view of a railway car truck embodying my invention, only one-half of the truck structure being shown inasmuch as the brake arrangement is similar on opposite sides thereof;

Figure 2 is a side elevation thereof;

Figure 3 is an end view taken from the right as seen in Figures 1 and 2; and

Figure 4 is an end view taken from the left as seen in those figures.

In the embodiment shown the truck frame comprises the side member 2, end rails 4 and 6, and spaced transoms 8 and 10 between which is supported in any convenient manner the swinging bolster 12 having the center bearing 14 and side bearing 16. The truck frame may be supported on any convenient form of resilient means (not shown), said resilient means being supported from equalizers 18, 18 (Figures 3 and 4), the ends of which are carried on the journal boxes 20, 20 (Figure 1) at opposite ends of the truck, said journal boxes forming the usual means of connection between the truck framework and the journal portions of the associated wheel and axle assemblies 22, 22.

The brake arrangement comprises the dead lever 24 fulcrumed intermediate its ends as at 26 from the bracket 28 formed as an integral part of the gusset 30 adjacent the juncture of the end rail 6 with the side member 2. Pivotally supported at the lower end of the dead lever 24 as at 32 is the brake head 34 with the associated shoe 36, said brake head having balancing means 38 of well known form. The upper end of the hanger lever 24 is pivotally connected as at 40 to the clevis means 42, the opposite end of said clevis means having a pivotal connection as at 44 to the dead horizontal slack adjuster lever 46 which is fulcrumed intermediate its ends as at 48 from the automatic slack adjuster 50 which is supported as at 52, 52 at the corner of the frame. The outer end of the slack adjuster lever 46 is pivotally connected as at 54 to the end of the pull rod 56, the opposite end thereof having a pivotal connection as at 58 to the live horizontal lever 60, the inner end of which has a pivotal connection as at 62 to the clevis means 64, said clevis means having a pivotal connection as at 66 to the upper end of the dead lever 68 which is fulcrumed intermediate its ends as at 70 from the bracket 72 integrally formed on the under side of the gusset 73 at the juncture of the side member 2 with the transom 10. The lower end of the dead lever 68 pivotally supports as at 74 the brake head 76 with the associated shoe 78, said head being afforded balancing means at 80. Intermediate the ends of the live lever 60 is connected as at 82 one end of the slack adjuster pull rod 84, said connection being made adjustable as by means of the manual slack adjuster 86, and the opposite end of the slack adjuster pull rod is pivotally connected as at 88 to the live horizontal lever 90 whose inner end is pivotally connected as at 92 to the clevis means 94, the opposite end whereof has a pivotal connection as at 96 to the upper end of the dead lever 98 which is fulcrumed intermediate its ends as at 100 from the bracket 102 integrally formed with the gusset 104 at the juncture of the side frame 2 with the transom 8. The lower end of the dead lever 98 pivotally supports as at 106 the brake head 108 with the associated shoe 110, said head being afforded balancing means as at 112.

The outer end of the live horizontal lever 90 has a pivotal connection as at 114 to the pull rod 116, whose opposite end is pivotally connected as at 118 to the upper end of the cylinder lever 120, the lower end of which is pivotally connected as at 122 to the piston 124 of the power means or brake cylinder 126 which is supported as at 128 from the downwardly projecting bracket 130 formed on the side member 2 adjacent its juncture with the end rail 4. Intermediate the ends of the cylinder lever 120 is pivotally connected as at 131 the link 132, the opposite end of which has a pivotal connection as at 134 intermediate the ends of the dead lever 136, the lower end of which is fulcrumed as at 138 from the bracket 140 formed at the head 142 of said cylinder body. The upper end of the fulcrum lever 136 has a pivotal connection as at 144 to the clevis means 146, the opposite end of which is pivotally connected as at 148 to the dead lever 150 which is fulcrumed intermediate its ends as at 152 from the bracket 154 secured on the top of the side rail 2. The inner end of the dead lever 150 has a pivotal connection as at 156 to the clevis means 158, the opposite end of which is pivotally connected as at 160 to the upper end of the dead lever 162, said dead lever being fulcrumed intermediate its ends as at 164 from the bracket 166 integrally formed on the bottom side of the gusset 168 at the juncture of the end rail 4 with the side member 2. The lower end of the dead lever 162 pivotally supports as at 170 the brake head 172 with the associated shoe 174 and balancing means is provided for said head as at 176.

In operation, assuming the parts to be in released position, actuation of the power means 126 moves the piston 124 to the left (Figure 2), rotating the cylinder lever 120 in a clockwise direction about the pivot 118 at its upper end, thus moving the link 132 to the left and rotating the dead lever 136 in a counterclockwise direction about the fulcrum at its lower end. Movement of the dead lever 136 causes clockwise rotation of the lever 150, thus applying the brake shoe 174, supported at the lower end of the lever 162, to the periphery of the adjacent wheel. Further movement causes the cylinder lever 120 to rotate in a clockwise direction about the fulcrum 131 intermediate its ends, thus moving the pull rod 116 to the right, rotating the live lever 90 in a counter-clockwise direction about the pivot 88 intermediate its ends to apply the brake shoe 108 supported at the lower end of the dead lever 98 to the opposite side of said wheel. Movement continues with the counter-clockwise motion of the live lever 90 about the fulcrum 92 at its inner end, thus moving the pull rod 84 to the right and rotating the live lever 60 in a clockwise direction about the pivot 58 at its outer end until the brake shoe 78 is brought into engagement with the periphery of the adjacent wheel. The movement continues with counterclockwise rotation of the live lever 60 about the fulcrum 62 at its inner end, moving the pull rod 56 to the right, causing counter-clockwise rotation of the slack adjuster lever 46 about the pivot 48 intermediate its ends and applying the brake shoe 36 at the lower end of the dead lever 24 to the opposite side of the last-mentioned wheel. Release of the power means causes the parts to move in the reverse directions to those just described, releasing the mechanism. Those skilled in the art will understand that the various parts of the mechanism operate in unison so that the brake shoes are applied to the opposite sides of each wheel substantially simultaneously and that the above simplified description of the operation is offered in explanation.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a brake rigging for a railway car truck, a frame, supporting wheels and axles, and braking means for the wheels at one side of said truck comprising a slack adjuster supported adjacent one end thereof, power means supported adjacent the other end, brake levers fulcrumed in said frame at opposite sides of each wheel supporting brake heads and brake shoes for engagement therewith, live auxiliary levers connected to the brake levers intermediate the wheels and connected to each other, dead auxiliary levers connected to the end brake levers, one of said dead auxiliary levers being fulcrumed from said slack adjuster and connected to the adjacent live auxiliary lever, and power means connected between the other live and dead auxiliary levers, the connection of said power means comprising live and dead cylinder levers connected to said auxiliary levers respectively and connected to each other, one of said cylinder levers being connected to the piston thereof and the other fulcrumed from the body thereof.

2. In a brake rigging for a railway car truck, a frame, supporting wheels and axles, and braking means for the wheels at one side of said truck comprising a slack adjuster supported adjacent one end thereof, power means supported adjacent the other end, brake levers fulcrumed in said frame at opposite sides of each wheel supporting brake heads and brake shoes for engagement therewith, live auxiliary levers connected to the brake levers intermediate the wheels and connected to each other, dead auxiliary levers connected to the end brake levers, one of said dead auxiliary levers being fulcrumed from said slack adjuster and connected to the adjacent live auxiliary lever, and power means connected between the other auxiliary levers, the connection of said power means comprising live and dead cylinder levers connected intermediate their ends and at corresponding ends to said auxiliary levers respectively, one of said cylinder levers being connected to the piston thereof.

3. In a brake rigging for a four wheel railway car truck, a frame, supporting wheel and axle assemblies, and braking means for the wheels at one side of said truck in the form of brake levers fulcrumed from said frame at opposite sides of each wheel and supporting brake heads and brake shoes therefor, auxiliary levers connected respectively to said brake levers, a pull rod connecting the auxiliary levers associated with one wheel, a pull rod connecting the auxiliary levers between the wheels, and power means connected between the auxiliary levers associated with another wheel, the connection of said power means between said auxiliary levers comprising live and dead cylinder levers connected intermediate their ends and connected at corresponding ends to said auxiliary levers respectively, one of said cylinder levers being connected to the piston thereof and the other of said cylinder levers being fulcrumed from the body thereof.

4. In a brake rigging for a railway car truck, a frame, supporting wheels and axles, and braking means for the wheels at one side of said truck in the form of brake levers fulcrumed intermediate their ends from said frame at opposite sides of each wheel and supporting brake heads and brake shoes adjacent their lower ends, live and dead auxiliary levers connected at their inner ends to said brake levers, a pull rod connecting the auxiliary levers associated with one wheel, an adjustable pull rod connecting adjacent live levers, and power means operatively connected between the auxiliary levers associated with the other wheel, the connection of said power means between said last-mentioned auxiliary levers comprising live and dead cylinder levers connected intermediate their ends and connected at corresponding ends to said last-mentioned auxiliary levers, one side of said cylinder levers being connected to the piston of said cylinder.

5. In brake rigging for a railway car truck, a frame, supporting wheels and axles, and braking means for the wheels at one side of said truck in the form of brake levers fulcrumed intermediate their ends from said frame at opposite sides of each wheel and supporting brake heads and brake shoes adjacent their lower ends, live and dead auxiliary levers connected at their inner ends to said brake levers, a pull rod connecting the auxiliary levers associated with one wheel, an adjustable pull rod connecting adjacent live levers, and power means operatively connected between the auxiliary levers associated with the other wheel, the connection of said power means between said last-mentioned auxiliary levers comprising live and dead cylinder levers connected intermediate their ends and connected at corresponding ends to said last-mentioned auxiliary levers, one of said cylinder levers being fulcrumed from the body of said cylinder.

6. In a brake rigging for a railway car truck, a frame, supporting wheels and axles, and braking means associated with the wheels at one side of said truck in the form of brake levers fulcrumed from said frame adjacent opposite sides of each wheel, end and intermediate auxiliary levers connected at corresponding ends to said brake levers respectively, pull rods interconnecting said intermediate levers and one of said end levers, and power means supported from said frame adjacent one end and operatively connected between one of said intermediate levers and the other of said end levers, the connection of said power means comprising a lever connected to the piston of said cylinder, a dead lever fulcrumed from said cylinder, means connecting points intermediate the ends of said last-mentioned levers, and connections between said last-mentioned levers respectively and the adjacent auxiliary levers.

7. In a brake rigging for a railway car truck, a frame, supporting wheels and axles, and braking means associated with the wheels at one side of said truck in the form of brake levers fulcrumed from said frame adjacent opposite sides of each wheel, end and intermediate auxiliary levers connected at corresponding ends to said brake levers respectively, pull rods interconnecting said intermediate levers and one of said end levers, and power means supported from said frame adjacent one end and operatively connected between one of said intermediate levers and the other of said end levers, said connection of said power means comprising live and dead cylinder levers connected intermediate their ends and connected respectively to the piston of said cylinder and to the body thereof, and connections between said cylinder levers and the adjacent auxiliary levers respectively.

8. In brake rigging for a railway car truck, a frame, supporting wheels and axles, and braking means for the wheels at one side of said truck in the form of brake levers fulcrumed intermediate their ends from said frame at opposite sides of each wheel and supporting brake heads and brake shoes adjacent their lower ends, live and dead auxiliary levers connected at their inner ends to said brake levers, a pull rod connecting the auxiliary levers associated with one wheel, an adjustable pull rod connecting adjacent live auxiliary levers, and power means operatively connected between the auxiliary levers associated with the other wheel, the connection of said power means between said last-mentioned auxiliary levers comprising live and dead cylinder levers connected intermediate their ends and connected at corresponding ends to said last-mentioned auxiliary levers.

9. In a brake rigging for a four wheel railway car truck, a frame, supporting wheel and axle assemblies, and braking means for the wheels at one side of said truck in the form of brake levers fulcrumed from said frame at opposite sides of each wheel and supporting brake heads and brake shoes therefor, auxiliary levers connected respectively to said brake levers, a pull rod connecting the auxiliary levers associated with one wheel, a pull rod connecting the auxiliary levers intermediate the wheels, and power means connected between the auxiliary levers associated with another wheel, the connection of said power means between said auxiliary levers comprising live and dead cylinder levers connected intermediate their ends and connected at corresponding ends to said auxiliary levers respectively.

10. In a brake rigging for a four wheel railway car truck, a frame, supporting wheel and axle assemblies, and braking means for the wheels at one side of said truck in the form of brake levers fulcrumed from said frame at opposite sides of each wheel and supporting brake heads and brake shoes therefor, auxiliary levers connected respectively to said brake levers, a pull rod connecting the auxiliary levers associated with one wheel, a pull rod connecting the auxiliary levers intermediate the wheels, and power means connected between the auxiliary levers associated with another wheel, the connection of said power means between said auxiliary levers comprising live and dead cylinder levers connected intermediate their ends and connected at corresponding ends to said auxiliary levers respectively, one of said cylinder levers being connected to the piston thereof.

11. In a brake rigging for a railway car truck, a frame, supporting wheels and axles, and braking means associated with the wheels at one side of said truck in the form of brake levers fulcrumed from said frame adjacent opposite sides of each wheel, end and intermediate auxiliary levers connected at corresponding ends to said brake levers respectively, pull rods interconnecting said intermediate levers and one of said end levers, and power means supported from said frame adjacent one end and operatively connected between one of said intermediate levers and the other of said end levers, the connection of said power means comprising a live cylinder lever connected to an intermediate auxiliary lever, a dead cylinder lever connected to an end auxiliary lever, and means connecting said cylinder levers intermediate their ends.

12. In a brake rigging for a railway car truck, a frame, supporting wheel and axles, and braking means for the wheels at one side of said truck comprising a slack adjuster supported adjacent one end thereof, power means supported adjacent the other end, brake levers fulcrumed in said frame at opposite sides of each wheel and supporting brake heads and brake shoes for engagement therewith, live auxiliary levers connected to the brake levers intermediate the wheels and connected to each other, dead auxiliary levers connected to the end brake levers, one of said dead auxiliary levers being fulcrumed from said slack adjuster and connected to the adjacent live auxiliary lever, and power means operatively connected between the other live and dead auxiliary levers.

13. In a brake rigging for a four wheel railway car truck, a frame, supporting wheel and axle assemblies, and braking means for the wheels at one side of said truck in the form of brake levers fulcrumed from said frame at opposite sides of each wheel and supporting brake heads and brake shoes therefor, live and dead auxiliary levers connected respectively to the brake levers associated with each wheel, a pull rod connecting the auxiliary levers associated with one wheel, a pull rod connecting live auxiliary levers, and power means connected between the auxiliary levers associated with another wheel, the connection between said live auxiliary levers being adjustable and intermediate the ends thereof.

14. In a brake rigging for a four wheel railway car truck, a frame, supporting wheel and axle assemblies, and braking means for the wheels at one side of said truck in the form of brake levers fulcrumed from said frame at opposite sides of each wheel and supporting brake heads and brake shoes therefor, auxiliary levers connected respectively to said brake levers, a pull rod connecting the auxiliary levers associated with one wheel, a pull rod connecting the auxiliary levers intermediate the wheels, and power means connected between the auxiliary levers associated with another wheel, one of said auxiliary levers having an automatically adjustable fulcrum from said frame.

15. In a railway car truck, a frame having a side member, supporting wheels and axles, braking means for said wheels in the form of brake levers fulcrumed from said frame adjacent opposite sides of each wheel, and means for operating said brake levers, said operating means comprising end and intermediate auxiliary levers connected at corresponding ends to adjacent brake levers respectively, said end auxiliary levers being fulcrumed from said frame, a pull rod connecting said intermediate auxiliary levers, a pull rod connecting the end and intermediate auxiliary levers adjacent one end of the truck, and power means mounted adjacent the opposite end of the truck and operatively connected between the other of said end and intermediate auxiliary levers.

16. In a brake rigging for a railway car truck, a frame, supporting wheels and axles, braking means comprising brake levers fulcrumed from said frame adjacent the opposite sides of each wheel, and means for operating said levers including power means and slack adjuster means supported adjacent opposite ends of said frame, interconnected auxiliary levers connected at their inner ends to said brake levers, said auxiliary levers at opposite ends of the frame being fulcrumed respectively from said frame and from said slack adjuster, and an operative connection between said power means and certain of said auxiliary levers.

17. In a railway car truck, a frame, supporting wheels and axles, and braking means for said wheels in the form of brake levers fulcrumed in said frame at opposite sides of each wheel, and means for operating said brake levers, said operating means comprising end auxiliary levers fulcrumed from said frame and connected to adjacent brake levers, intermediate auxiliary levers connected to adjacent brake levers, pull rods interconnecting said intermediate and one of said end auxiliary levers, and power means mounted on said frame and operatively connected between the other of said end levers and the adjacent intermediate lever.

18. In a brake rigging for a railway car truck, a frame, supporting wheels and axles, and braking means associated with the wheels at one side of said truck in the form of brake levers fulcrumed from said frame adjacent opposite sides of each wheel, end and intermediate auxiliary levers connected at corresponding ends to said brake levers respectively, pull rods interconnecting said intermediate levers and one of said end levers, and power means supported from said frame adjacent one end and operatively connected between one of said intermediate levers and the other of said end levers.

19. In a brake rigging for four wheel railway truck, a frame, supporting wheel and axle assemblies, and braking means for the wheels at one side of said truck in the form of brake levers fulcrumed from said frame at opposite sides of each wheel and supporting brake heads and brake shoes therefor, live and dead auxiliary levers connected respectively to brake levers associated with each wheel, a pull rod connecting the auxiliary levers associated with one wheel, a pull rod connecting live auxiliary levers, and power means connected between the auxiliary levers associated with another wheel.

20. In a railway car truck, a frame, supporting wheels and axles, and brake rigging comprising brake levers fulcrumed from said frame and supporting brake heads and shoes adjacent opposite sides of each wheel, end and intermediate auxiliary levers connected at corresponding ends to adjacent brake levers, a pull rod adjustably connecting said intermediate levers, a pull rod connecting an end and an intermediate lever, and power means operatively connected between the other end and intermediate levers.

21. In a brake arrangement, brake levers supporting brake heads and brake shoes at opposite sides of a wheel, auxiliary levers connected to said brake levers respectively, and power means operatively connected between said auxiliary levers, said power connection comprising live and dead cylinder levers connected intermediate their ends and connected respectively to the piston of said cylinder and to the body thereof.

22. In a brake arrangement, brake levers supporting brake heads and brake shoes at opposite sides of a wheel, auxiliary levers connected to said brake levers respectively, power means operatively connected between said auxiliary levers, said power connection comprising live and dead cylinder levers connected intermediate their ends and connected respectively to the piston of said cylinder and to the body thereof, and connections between said cylinder levers and the adjacent auxiliary levers respectively.

23. In a railway car truck, a frame, supporting wheels and axles, and braking means for the wheels at one side of said truck comprising truck levers supported at each side of each wheel, end and intermediate auxiliary levers connected respectively to said truck levers, pull rods connecting said intermediate levers and one of said end levers, and power means operatively connected between one of said intermediate levers and the other end lever.

24. In a railway car truck, a frame, supporting wheels and axles, and braking means for the wheels at one side of said truck comprising truck levers supported at each side of each wheel, end and intermediate auxiliary levers connected respectively to said truck levers, pull rods connecting said intermediate levers and one of said end levers, power means operatively connected between one of said intermediate levers and the other end lever, said power connection comprising interconnected cylinder levers connected at corresponding ends to the piston of said cylinder and the body thereof, and operative connections between the opposite ends of said cylinder levers and the adjacent end and intermediate auxiliary levers.

25. In a railway car truck, a frame, supporting wheel and axle assemblies, braking means for the wheels at one side of said truck comprising dead truck levers supporting brake heads and brake shoes at opposite sides of each wheel, end and intermediate auxiliary levers connected respectively to said truck levers, a pull rod adjustably connecting said intermediate levers, a pull rod connecting one of said intermediate levers and an end lever, and power means operatively connected between the other end lever and the adjacent intermediate lever.

26. In a railway car truck, a frame, supporting wheel and axle assemblies, braking means for the wheels at one side of said truck comprising dead truck levers supporting brake heads and brake shoes at opposite sides of each wheel, end and intermediate auxiliary levers connected respectively to said truck levers, a pull rod adjustably connecting said intermediate levers, a pull rod connecting one of said intermediate levers and an end lever, power means operatively connected between the other end lever and the adjacent intermediate lever, said operative connection comprising vertically arranged live and dead cylinder levers connected respectively to the piston of said cylinder and to the body thereof and connected intermediate their ends to each other, and connections between said cylinder levers and the adjacent end and intermediate auxiliary levers.

27. In a railway car truck, a frame, supporting wheel and axle assemblies, power means on said frame adjacent one corner, braking means for the wheels at one side of the truck comprising dead truck levers fulcrumed from said frame intermediate their ends and supporting brake heads and brake shoes at opposite sides of each wheel, intermediate auxiliary levers connected to said truck levers between the wheels, and auxiliary levers connected to the truck levers outwardly of the wheels, an adjustable connection between said intermediate levers, a pull rod connecting one of said intermediate levers with the adjacent end lever, said power means being operatively connected between the other intermediate lever and the other end lever.

28. In a railway car truck, a frame, supporting wheel and axle assemblies, power means on said frame adjacent one corner, braking means for the wheels at one side of the truck comprising dead truck levers fulcrumed from said frame intermediate their ends and supporting brake heads and brake shoes at opposite sides of each wheel, intermediate auxiliary levers connected to said truck levers between the wheels, auxiliary levers connected to the truck levers outwardly of the wheels, an adjustable connection between said intermediate levers, a pull rod connecting one of said intermediate levers with the adjacent end lever, said power means being operatively connected between the other intermediate lever and the other end lever, said operative power connection comprising interconnected live and dead cylinder levers connected at corresponding ends to the piston of said cylinder and to the body thereof, and connections between said cylinder levers and the adjacent end and intermediate auxiliary levers.

29. In a railway car truck, a frame, supporting wheel and axle assemblies, power means on the frame adjacent one corner, braking means for the wheels at one side of said truck comprising brake levers supporting brake heads and brake shoes at opposite sides of each wheel, intermediate levers connected to the brake levers intermediate the wheels, end levers connected to the brake levers outwardly of the wheels, at least one of said end levers being adjustably fulcrumed from said frame, a pull rod adjustably connecting said intermediate levers, a pull rod connecting an intermediate lever and the adjacent end lever, said power means being operatively connected between the other intermediate lever and the other end lever.

30. In a railway car truck, a frame, supporting wheel and axle assemblies, power means on the frame adjacent one corner, braking means for the wheels at one side of said truck comprising brake levers supporting brake heads and brake shoes at opposite sides of each wheel, intermediate levers connected to the brake levers intermediate the wheels, end levers connected to the brake levers outwardly of the wheels, at least one of said end levers being adjustably fulcrumed from said frame, a pull rod adjustably connecting said intermediate levers, a pull rod connecting an intermediate lever and the adjacent end lever, said power means being operatively connected between the other intermediate lever and the other end lever, said power connection comprising interconnected dead and live cylinder levers connected at corresponding ends to the body and piston respectively of said cylinder and connected at their other corresponding ends respectively to the adjacent end and intermediate levers.

CARL E. TACK.